United States Patent
> Varaney

[15] 3,641,698
[45] Feb. 15, 1972

[54] FISHING LURE
[72] Inventor: John A. Varaney, 23 Overton Ave., Milford, Conn. 06460
[22] Filed: Apr. 29, 1969
[21] Appl. No.: 820,071

[52] U.S. Cl. ..................................................43/42.48
[51] Int. Cl. ........................................................A01k 85/00
[58] Field of Search ..................................43/42.48, 42.45

[56] References Cited

UNITED STATES PATENTS

| | | | |
|---|---|---|---|
| Des.146,488 | 3/1947 | Short | 43/42.48 UX |
| 2,038,127 | 4/1936 | Pflueger | 43/42.48 X |
| 2,133,032 | 10/1938 | Martz | 43/42.48 |
| 3,024,562 | 3/1962 | Halling | 43/42.48 |
| 3,146,543 | 9/1964 | McVay | 43/42.45 |

Primary Examiner—Samuel Koren
Assistant Examiner—Daniel J. Leach
Attorney—Mattern, Ware and Davis

[57] ABSTRACT

A fish lure shaped to resemble live bait fish and having water reaction surfaces which produce movements simulating the undulating, rolling, wagging movements of a swimming bait fish through reaction to water pressures as the lure is drawn through the water during normal fishing techniques, such as retrieving following casting, trolling from behind a moving boat, and jigging in deep water from an anchored boat or wharf. The water reaction surfaces also maintain stability of the lure against spinning, planing to the top, or sinking to the bottom.

4 Claims, 20 Drawing Figures

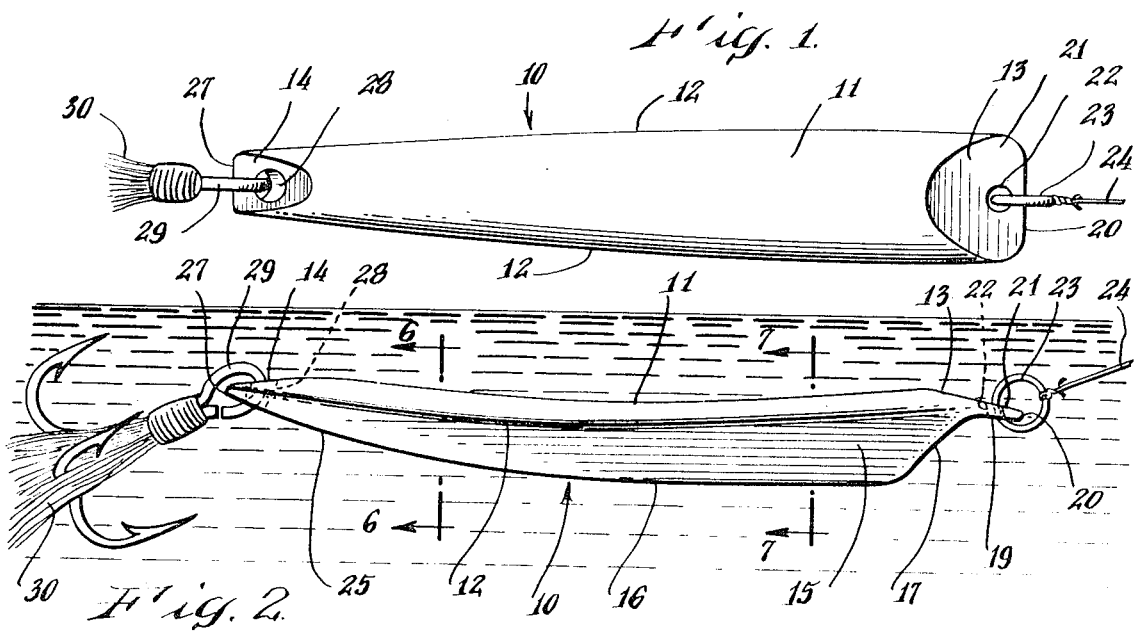
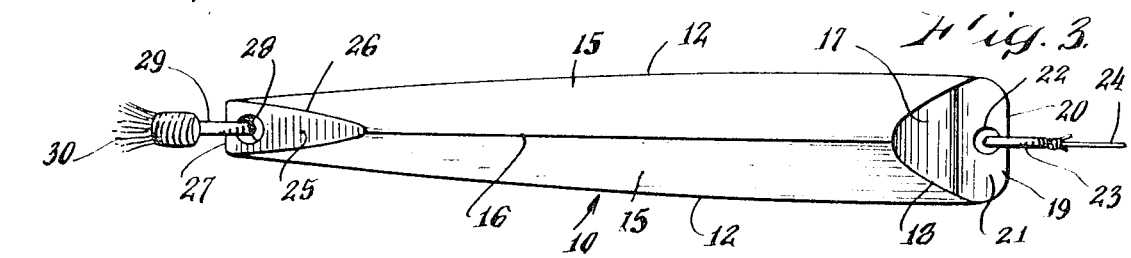
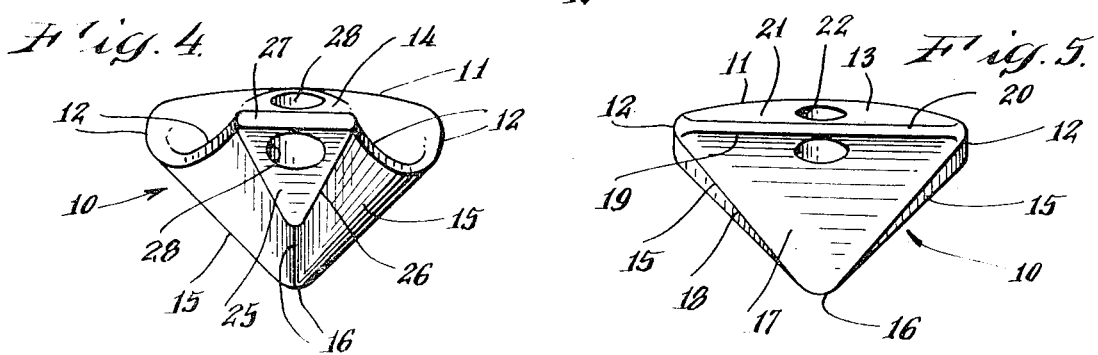
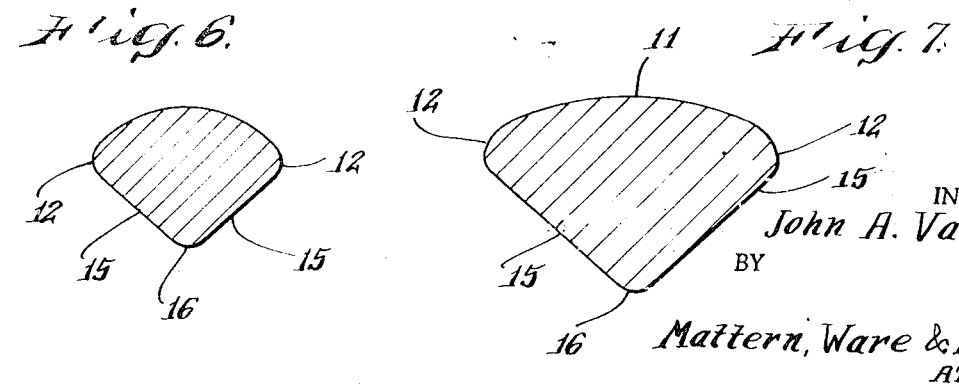

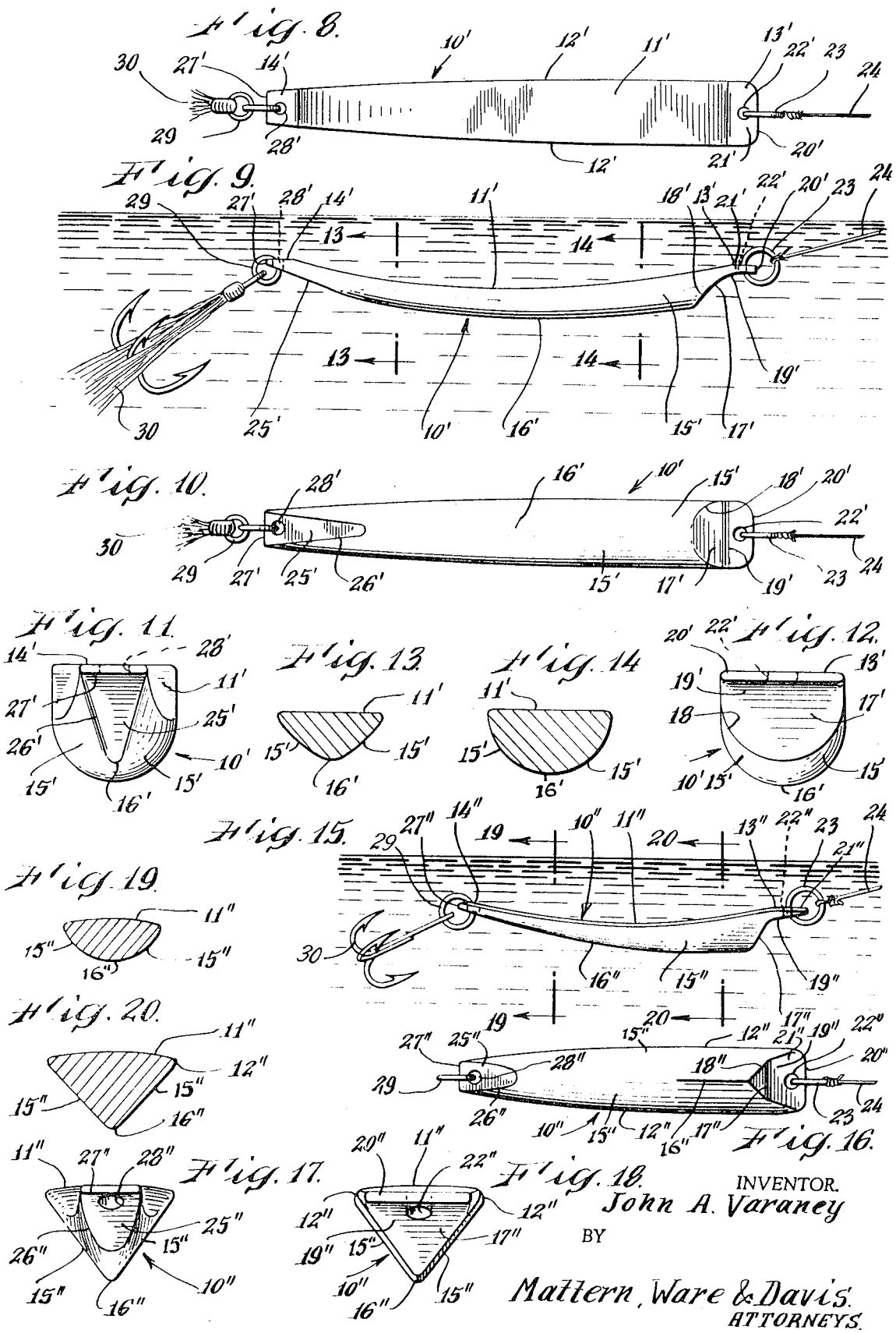

FISHING LURE

BRIEF SUMMARY OF THE INVENTION

The present invention relates to a fish lure. It has for its primary object to provide a lure which when drawn through the water closely simulates swimming live bait fish, both in appearance and in its movements.

A further object is to provide a lure having a substantially basic shape, which, through variation in its size and length, may be used in fishing for either large or small fish; and, by variation in weight relative to size and length, through the use in its manufacture of suitable heavy or lightweight metals or other materials, may be used for all types of fishing, such as trolling or casting, both in deep and shallow water, and jigging from an anchored boat or wharf in deep water.

The lure is an elongated solid metal body of fish-simulating shape, generally tapered from head to tail and downwardly bowed head and tail. It has a relatively wide top surface which is substantially flat transversely between rearwardly convergent side edges and is downwardly bowed between its head and tail ends. Side surfaces converge downwardly from the side edges of the top surface to the bottom keel surface which is downwardly bowed in substantial conformity to the top surface and provide angularly displaced light-reflecting surfaces visible to a fish swimming beneath the lure and closely resembling in appearance and effect the underside of swimming live bait fish. The side surfaces may be either flat or convex between the side edges of the top and the keel surface, or partially flat and partially convex.

The head end of the lure is provided with a relatively large area upwardly and forwardly inclined scooplike prow surface forming relatively sharp corners with the forward ends of the side and keel surfaces, and which terminates at its upward end in a forwardly projecting substantially flat lip which is apertured for receiving the connection ring or the like of a conventional fishing line. This lip prevents planing to the top to thus maintain a desired level in the water as the prow surface deflects water downwardly and at each side to impart fish-simulating movement to the lure.

At the same time, the relatively wide, transversely substantially flat, longitudinally downwardly bowed top surface reduces water resistance and, in cooperation with the downwardly convergent side surfaces and the downwardly bowed keel surface, gives a low center of gravity to the lure to prevent it from rolling over or spinning, and controls its sink rate.

At the tail end in substantially longitudinal alignment with the relatively large area prow surface a relatively small area substantially flat upwardly and rearwardly inclined stern surface extends from the tail end of the keel surface in rearwardly convergent relation to the tail end of the top surface, thus presenting a downwardly facing resistance surface to the water which keeps the tail end of the lure from dropping lower than the head end and provides with the top surface a relatively thin rearwardly tapered tail end which is apertured for attaching a hook or hook leader to the lure.

The area differential between the relatively large area prow surface and the relatively small area stern surface cooperate to produce the fish-simulating undulating, rolling and wagging movements of the lure as a result of the differential pressures and directions of the flow of water in relation to these surfaces as the lure is drawn through the water.

BRIEF DESCRIPTION OF THE DRAWINGS

FIG. 1 is a top plan view of a fish lure in accordance with one embodiment of the invention;

FIG. 2 is a side elevation shown as it appears in water;

FIG. 3 is a bottom plan view;

FIG. 4 is a rear or tail end view on an enlarged scale;

FIG. 5 is a front or head end view on an enlarged scale;

FIG. 6 is a transverse sectional view on an enlarged scale along the line 6—6 of FIG. 2;

FIG. 7 is a transverse sectional view of an enlarged scale along line 7—7 of FIG. 2;

FIG. 8 is a plan view of a modified embodiment of the invention;

FIG. 9 is a side elevation as it appears in water;

FIG. 10 is a bottom plan view;

FIG. 11 is a rear or tail end view on an enlarged scale;

FIG. 12 is a front or head end view on an enlarged scale;

FIG. 13 is a transverse sectional view on an enlarged scale along line 13—13 of FIG. 9;

FIG. 14 is a transverse sectional view on an enlarged scale along line 14—14 of FIG. 9;

FIG. 15 is a side elevation of another modified embodiment of the invention shown as it appears in water;

FIG. 16 is a bottom plan view;

FIG. 17 is a rear or tail end view on an enlarged scale;

FIG. 18 is a front or head end view on an enlarged scale;

FIG. 19 is a transverse sectional view on an enlarged scale along line 19—19 of FIG. 15; and FIG. 20 is a transverse sectional view on an enlarged scale along line 20—20 of FIG. 15.

DETAILED DESCRIPTION OF THE INVENTION

Referring to the drawings and more particularly to FIGS. 1–7, the fish lure 10 according to the exemplary embodiment of the invention illustrated therein is formed of solid metal and is of a size, approximately 5½ to 6 inches long, especially suited to the catching of relatively large fish such as striped bass, and is of a weight, approximately 1½ ounces, which makes it suitable for effective surf casting as well as retrieving at a relatively slow speed. In order to attain this light weight to large size relationship, the metal employed may be a lightweight low-density metal such as aluminum or magnesium, preferably chrome plated to resist corrosion in salt water and to impart shiny reflective surfaces to the lure for a purpose presently to be more fully pointed out.

The lure 10 is provided with a relatively wide elongated top surface 11 longitudinally bowed downwardly between the head and tail ends of the lure and substantially flat transversely between its side edges 12—12, which converge slightly and are slightly bowed outwardly from the head end to the tail end of the lure. While the transversely relatively flat top surface may be transversely straight between the side edges, the top surface in this embodiment of the invention is preferably transversely convex, the convexity being to a lesser degree toward the head of the lure, as shown by the sectional view of FIG. 7, and to a greater degreee toward the tail of the lure, as shown by the section view FIG. 6. At the head end of the lure, the longitudinally downwardly bowed top surface 11 terminates in a flat upper head surface 13, and at the tail end it terminates in a flat upper tail surface 14.

Side surfaces 15—15 are connected to the side edges 12—12 of the top surface 11 by rounded corners as shown in FIGS. 6 and 7 and converge downwardly to a slightly transversely rounded bottom keel surface 16, which is longitudinally bowed downwardly between the head and tail ends of the lure in substantial correspondence with the longitudinally bowed top surface 11. The substantially transversely flat top surface and the downwardly convergent side surfaces thus give the lure a cross-sectional shape substantially in the form of an inverted isosceles triangle. While the side surfaces 15 are substantially straight transversely between the side edges of the top and the keel, they may be slightly convex.

By virtue of the convergent outwardly bowed side edges of the top surface and the downwardly bowed keel surface the side surfaces are slightly bowed outwardly between the head and tail ends of the lure. Thus, while the side surfaces are not true planar mirror surfaces, they are sufficiently light reflective and are so angularly displaced relative to each other as to produce through rocking or wagging movement imparted to the lure constantly moving multidirectional fish-attracting light reflections.

The slight outward bowing of the side surfaces also gives a streamlined form to the lure which reduces its resistance to pressures when being drawn through water, thus enhancing its ability to remain stable while being retrieved or trolled. The relationship of the downwardly convergent side surfaces to the substantially flat, relatively wide top surface controls the sink rate of the lure, maintaining it at a level determined by the retrieving or trolling speed imparted to it by the fisherman, and also resists spinning or inversion of the lure as it is drawn through the water.

At the head end of the lure, there is provided an upwardly and forwardly inclined, slightly concavely curved scooplike relatively large area prow surface 17 joined by relatively sharp corners 18 to the forward ends of the side and keel surfaces 15—15 and 16 and terminating at its upper end in a forwardly projecting, substantially horizontal flat surface 19 connected by the forward edge surface 20 of the lure with the flat surface 13 at the head end of the top surface 11 forming therewith a thin forwardly projecting lip 21 in which a hole 22 is provided for receiving the attaching ring or the like 23 of the fishline 24.

At the tail end of the lure in substantially direct longitudinal line with the relatively large area prow surface 17 there is provided a relatively small area upwardly and rearwardly inclined flat stern surface 25 joined to the rearward ends of the side and keel surfaces by relatively sharp corners 26 and joined to the flat surface 14 at the tail end of the top surface 11 by the rearward end surface 27 of the lure, thus forming with the surface 14 a rearwardly convergent, relatively thin tail end to the lure in which a hole 28 is provided for receiving the ring end 29 or other attaching means of a dressed hook 30 or other suitable fishing tackle. The downwardly facing stern surface 25, in addition to reducing the weight of the tail end of the lure and thus establishing the center of gravity of the lure substantially at the low point of the downwardly bowed keel, presents a downwardly facing surface against which water pressure is exerted, which, in addition to the pressure of water flowing against the trailing hook 30 tends to keep the tail end of the lure from dropping below the head end.

The differential in area between the prow surface 17 and the stern surface 25 and their longitudinal alignment with each other are such as to cause the lure as it is drawn through the water to have an undulating, rolling and wagging motion similar to that of swimming live bait fish. The forward prow surface deflects water downwardly and at each side about the corners 18 along the sides of the lure, while at the same time and with somewhat reduced force water flows from the side surfaces about the corners 26 beneath and behind the stern surface 25, producing in effect a negative pressure on the stern surface as distinguished from the positive pressure on the prow surface. The differential in pressure and direction of the flowing water in relation to the differential area prow and stern surfaces thus imparts undulating, rolling and wagging motion to the lure.

In FIGS. 8–14 there is illustrated a modified embodiment of the invention wherein the lure 10' is somewhat smaller in length and weight than the lure 10 of the first embodiment and is especially adapted for trolling for medium size fish, for example bluefish, at depths of about 20 to 30 feet. Like the lure 10 of the first embodiment, the modified lure 10' is also formed of a relatively light, low-density metal, such as aluminum or magnesium, and is chrome-plated to resist erosion in salt water and present shiny reflective surfaces. In practice, the lure 10' may be about 4½ inches in length and three-fourths ounce in weight.

The top surface 11' is transversely straight between its side edges 12', as distinguished from the transversely convex substantially flat top surface 11 of the first embodiment, and terminates at its ends in flat upper head and tail surfaces 13' and 14'. The side surfaces 15' are of pronounced convexity along about the forward half of the lure so that they blend with the keel surface 16' to form a substantially semicircular cross-sectional shape, as shown in FIG. 14, and along about the rearward half are only slightly convex, as shown in FIG. 13, and blend with a keel surface 16' having substantially the same transverse convexity as the forward keel surface 16' as shown in FIG. 14.

The prow surface 17' is connected to the side surfaces by relatively sharp corners 18' and terminates at its upper end to a forwardly projecting flat surface 19' connected by the forward edge 20' of the lure to the flat upper head surface 13' to form a forwardly projecting lip 21' provided with a hole 22' for receiving the attaching ring 23 of the fish line 24.

The stern surface 25' is substantially similar to the stern surface 25 of the first embodiment, being connected to the side and keel surfaces by relatively sharp edge corners 26 and connected to the flat upper tail surface 14' by the rearward end surface 27 of the lure, and having a hole 28' for receiving the ring 29' of a dressed hook 30'. By virtue of the modified cross-sectional shape of the lure 10' it will have a substantially slower sink rate than the lure 10 of the first embodiment.

In FIGS. 15–20, there is illustrated another modified embodiment of the invention especially adapted for deep water trolling and the catching of relatively small fish, being substantially smaller than the lure 10' of the second embodiment. The lure 10" in practice may be about 3 inches long and about 1 ounce in weight, and is preferably formed of a relatively dense heavy metal, such as brass, and also may be chrome-plated to resist erosion. The top surface 11" of the lure 10" is transversely slightly convex, as shown in FIGS. 19 and 20. The forward portions of the side surfaces 15" are substantially flat transversely, as shown in FIG. 20, and the rearward portions of the side surfaces are convex and blend with the keel surface 16", as shown in FIG. 19. The upwardly and forwardly inclined prow surface 17" is connected to the side and keel surfaces by relatively sharp corners 18", is relatively flat, and forms an obtuse angle with the forwardly projecting flat under lip surface 19" connected by the forward edge 20" of the lure to the top head surface 13" to form the forwardly projecting lip 21", which is provided with a hole 22" for receiving the ring connector 23 of a fishline 24.

The stern surface 25" is substantially like the stern surfaces 25 and 25' of the first and second embodiments but is smoothly blended with the side and keel surfaces by rounded corners 26", is distinguished from the sharp corners 26 and 26' of the first and second embodiments, and is connected to the flat top tail surface 14" by the rearward end edge 27" of the lure, and is provided with a hole 28" for receiving the connecting ring 29 of a hook 30.

I have illustrated and described preferred and satisfactory embodiments of the invention, but it will be understood that changes may be made therein within the spirit and scope as defined in the appended claims.

I claim:

1. A live bait fish simulating fish lure comprising an elongated solid body having:
   a. a transversely flat longitudinally extending top surface longitudinally bowed downwardly between its head and tail ends and having rearwardly convergent side edges;
   b. a longitudinally extending bottom keel surface coinciding centrally with the central vertical longitudinal plane of the lure and longitudinally bowed downwardly between its head and tail ends;
   c. side surfaces converging downwardly between the longitudinal side edges of said top surface and said keel surface;
   d. an upwardly and forwardly inclined prow surface joined at its side and bottom edges with the forward ends of said side and keel surfaces; and
   e. a forwardly projecting lip at the head end of said body having a substantially flat forwardly and downwardly inclined upper surface extending forwardly from said downwardly bowed top surface and a substantially flat forwardly and downwardly inclined lower surface extending forwardly from the upper edge of said prow surface.

2. A fish lure as defined in claim 1 wherein said upper and lower surfaces of said lip are in substantially parallel planes.

3. A live bait fish simulating fish lure comprising an elongated solid body having:

a. a transversely substantially flat longitudinally extending top surface longitudinally bowed downwardly between its head and tail ends and having rearwardly convergent side edges;
b. A longitudinally extending bottom keel surface coinciding centrally with the central vertical longitudinal plane of the lure and longitudinally bowed downwardly between its head and tail ends;
c. side surfaces converging downwardly between the longitudinal side edges of said top surface and said keel surface;
d. an upwardly and forwardly inclined prow surface joined at its side and bottom edges with the forward ends of said side and keel surfaces;
e. a forwardly projecting lip at the head end of said body having a substantially flat upper surface extending forwardly from said downwardly bowed top surface and a substantially flat lower surface extending forwardly from the upper edge of said prow surfaces; and
f. a rearwardly and upwardly inclined substantially flat stern surface in substantially longitudinal alignment with said prow surface joined at its side and bottom edges with the rearward ends of said side and keel surfaces.

4. A fish lure as defined in claim 3 wherein said prow surface has a substantially larger area than said stern surface.

* * * * *